Sept. 21, 1926.
N. W. DORMAN ET AL
1,600,403
CONTROL FOR POWER PRESSES
Filed August 17, 1925    3 Sheets-Sheet 2
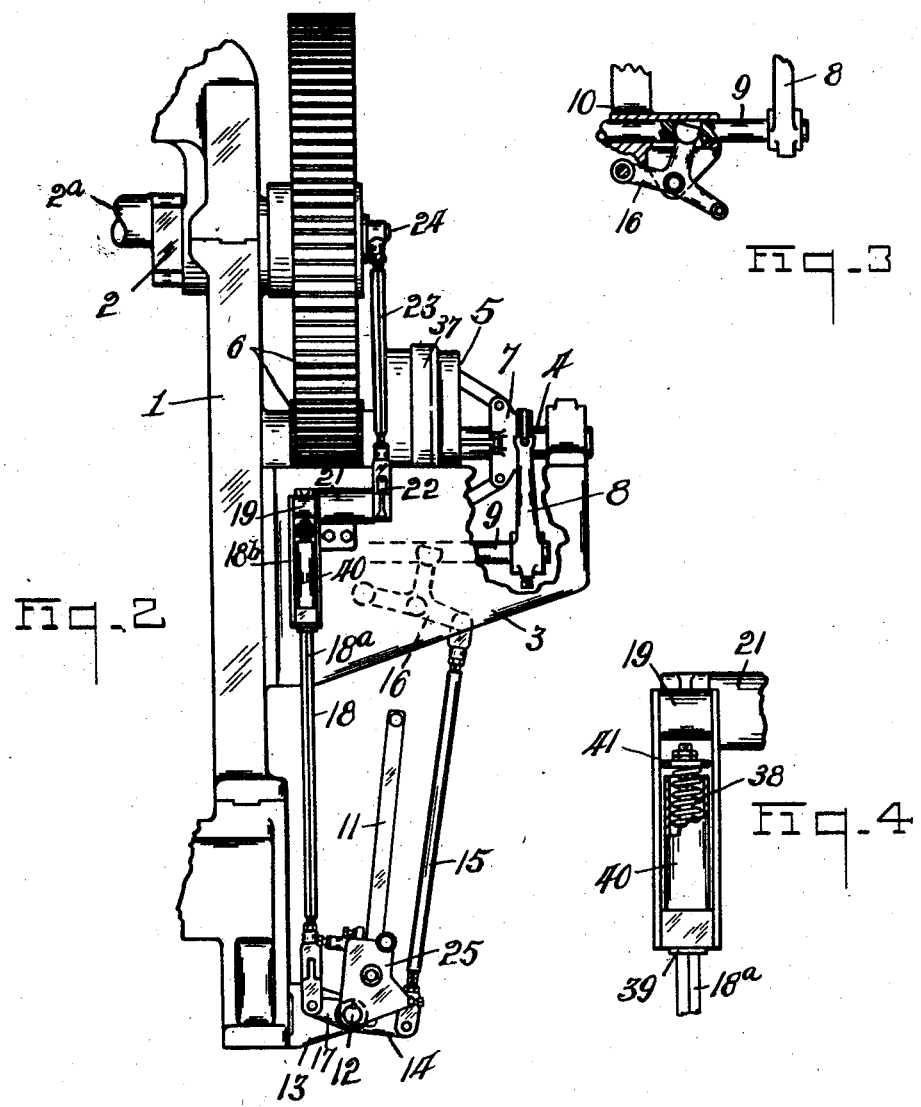
Inventor
Neal W. Dorman.
Meredith R. Hatch.
By Owen Owen & Crampton
Attorneys.

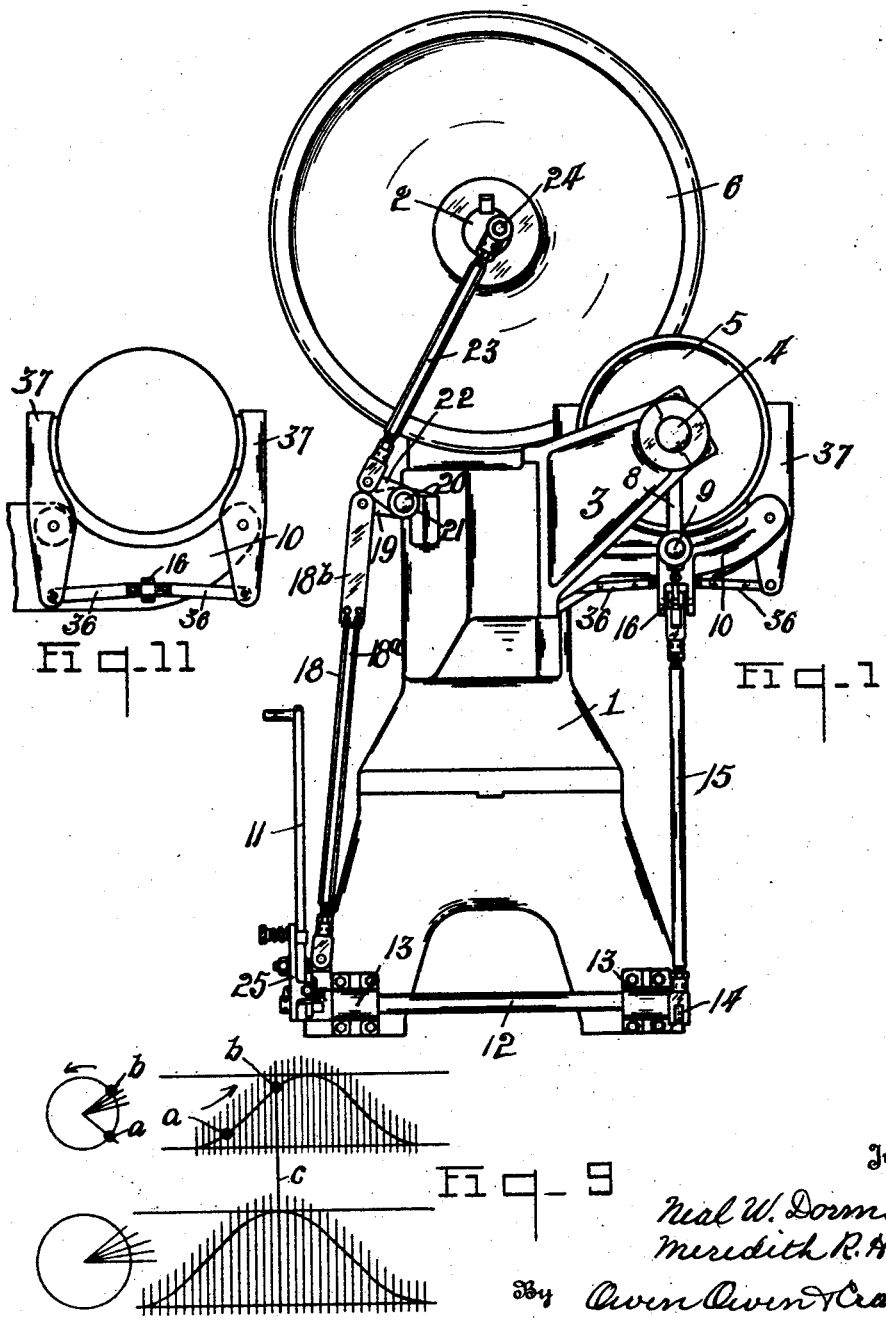

Sept. 21, 1926.  
N. W. DORMAN ET AL  
CONTROL FOR POWER PRESSES  
Filed August 17, 1925  
1,600,403  
3 Sheets-Sheet 3
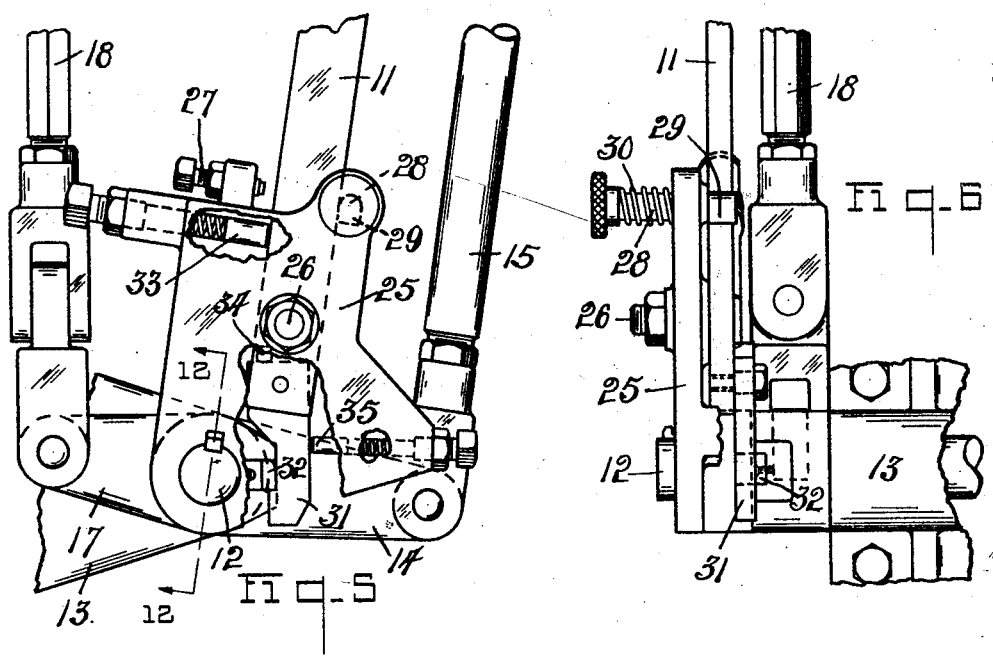
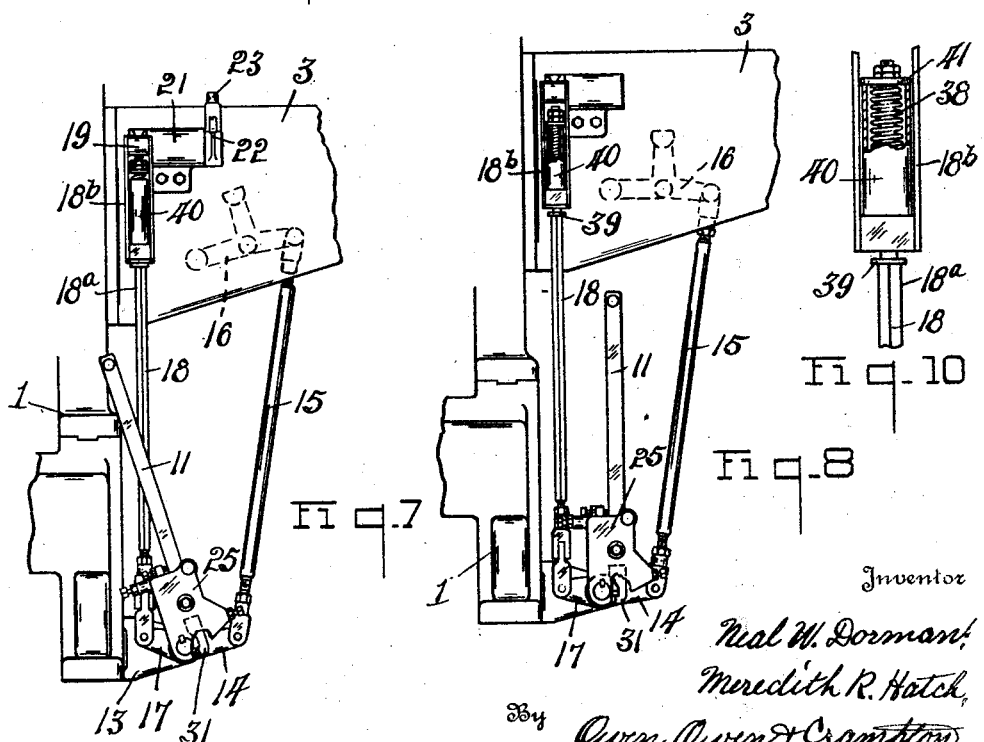

Patented Sept. 21, 1926.

1,600,403

UNITED STATES PATENT OFFICE.

NEAL W. DORMAN AND MEREDITH R. HATCH, OF TOLEDO, OHIO, ASSIGNORS TO THE TOLEDO MACHINE & TOOL COMPANY, OF TOLEDO, OHIO, A CORPORATION OF OHIO.

CONTROL FOR POWER PRESSES.

Application filed August 17, 1925. Serial No. 50,570.

This invention relates to means adapted to be connected to the manually operated clutch control means of power presses and is capable of automatic operation to release the drive clutch of the associated press at, or adjacent to, the end of each cycle, or of being rendered inoperative at will with respect to the clutch control means whereby the press may be run until stopped by a manual throwing out of the clutch.

The primary object of the invention is the provision of a novel mechanism of the class described which is automatically operable a sufficient distance before the crank shaft of the associated press is at the limit of its out stroke to effect a positive stopping of the press at such limit, instead of running the liability of the press parts moving past such limit and possibly causing an accident. Further objects and advantages of the invention will be apparent from the following detailed description thereof.

While the invention in its broader aspects is capable of embodiment in numerous forms, one commercial embodiment thereof is illustrated in the accompanying drawings, in which,—

Figure 1 is a side elevation of a power press with the mechanism embodying the invention in operative connection therewith and in inoperative or "at rest" position. Fig. 2 is a fragmentary front elevation of the press with the mechanism embodying the invention in inoperative or "at rest" position. Fig. 3 is a fragmentary detail of a portion of the clutch throw-out means. Fig. 4 is a fragmentary detail of a portion of the mechanism embodying the invention, with the associated parts in normal position. Fig. 5 is an enlarged fragmentary outer side elevation, with parts broken away, of a portion of the control mechanism embodying the invention, and with the parts in normal inoperative position. Fig. 6 is a fragmentary front elevation thereof. Fig. 7 is a detail of the clutch throw-out mechanism in the position which it assumes when the control lever is thrown to operating position and when the mechanism is at the beginning of a cycle of operations, and with parts broken away. Fig. 8 is a similar view of said mechanism with parts broken away, and with the parts in partly released position. Fig. 9 is a diagram of the relative movements of the crank shaft of the press and the point of connection of the control mechanism therewith. Fig. 10 is a fragmentary detail of a portion of the clutch control mechanism with the brake-applying spring thereof compressed. Fig. 11 is a detail of the brake means, and Fig. 12 is a sectional fragmentary detail of a portion of the clutch control mechanism.

Referring to the drawings, 1 designates the frame of a power press, 2 the customary crank or operating shaft, which, in the present instance, is mounted in the upper portion of said frame, 3 a bracket projecting from one side of the frame, 4 a power shaft journaled in said bracket and having a clutch 5 in driving connection with the shaft 2, in the present instance, through a train of gears 6. The engaging and releasing movements of the clutch lever are effected by a shifting of a collar 7 on the shaft 4, as is well understood in the art, and the movements of this collar are controlled by an arm 8, which projects from a rod 9 that is mounted for longitudinal reciprocatory movements in an extension 10 of the bracket 3.

The hand control lever 11 for the clutch is mounted on a rock shaft 12, in convenient reach of the operator, said shaft being journaled in bearings 13 at the side of the frame 1, below the bracket 3. The shaft 12 is provided at one end with a rocker arm 14, which is connected by link 15 to one arm of a three-arm lever 16, which is mounted in the frame extension 10, below the rod 9, and has one arm engaging said rod to impart clutch-engaging or releasing movements thereto when the lever 11 is operated. The connection between the control lever 11 and the clutch 5 is such, in the present instance, that when the lever is in the position shown in Figs. 1, 2 and 5, the clutch is disengaged, and when thrown to the left from such position to the position indicated in Fig. 7, the clutch is thrown into engagement. It will be understood that both the control lever 11 and the rocker arm 14 are fixed to the shaft 12 to rock therewith.

Nothing new is claimed for the mechanism above described, as it is common in one form or another in power presses. Such mechanism, as well as the type of machine to which applied, may vary materially without affecting the operation of the mechanism embodying the invention, which will now be described.

A rocker arm 17 is loosely mounted on the shaft 12 at a side of the lever 11 and projects from the shaft in the opposite direction to the arm 14. A member 18 extends upwardly from and connects the outer end of the arm 17 to a rocker arm 19 projecting outwardly from a short rock-shaft 20 journaled in the bearing bracket 21, secured to the frame bracket 3. Another arm 22 projects downwardly from the shaft 20 and is connected by a rod, or link, 23 to a wrist-pin 24 projecting from the adjacent outer end of the crank shaft 2. An important feature of the present invention consists in mounting the wrist-pin 24 in retarded offset relation to the crank-arm 2ª of the crank shaft, so that when the crank-arm is at the upward limit of its stroke, the wrist-pin will be retarded approximately 60° from the upper end of its up stroke, as illustrated in Fig. 1, which shows the "at rest" position of the press mechanism and control parts with the crank-arm 2ª of the press at the upward limit of its stroke. The connection between the shaft 12 and crank-shaft 2 is such that the arm 17 is swung upward during the upward stroke of the wrist-pin 24, and downward during the downward stroke of such wrist-pin.

The control lever 11 is provided, at its lower end, with a head 25, which is the part of the lever that is fixed to the shaft 12, and the lever arm 11 itself is pivoted at 26 to this head for limited rocking movements relative thereto, such rocking movements being in the plane of rocking movements of the head with the shaft, and being limited in the forward or clutch-engaging movement of the lever by an adjustable stop screw 27 on the head, and limited in the opposite direction by a stem or shank portion of a pin 28, which is mounted for sliding movements in the head 25. This pin is provided with a cam portion, or side enlargement, 29, that is turnable into, or out of, engaging relation to the lever arm 11. When the enlargement 29 is turned into engaging relation to the lever arm 11 it holds such arm in engagement with the stop screw 27 and prevents a rocking of the lever arm relative to the head 25. The pin 28 may be pressed inwardly against the tension of the coil spring 30 thereon, to place its enlargement 29 out of register with the lever arm and permit it to be turned into, or out of, operative position.

The lower end of the lever arm 11 projects below its pivot 26 and pivotally carries a hook form of catch 31, which is adapted to engage a tooth or catch member 32 on the inner sleeve-end of the rocker arm 17, when such rocker arm is in its "at rest" position shown in Figs. 2 and 5, and the lever 11, 25 is in its inoperative clutch-releasing position shown in said figures, with the arm 11 in engagement with the small side of the pin 28. This latter engagement is normally maintained by a spring pressed detent 33, which is carried by the head 25 and acts against the side of the lever arm adjacent to the stop-pin 27. The catch 31 is yieldingly held in engagement with the tooth 32 and in inward stop engagement with a stop 34 on the arm 11, by a spring pressed detent 35, that is carried by the lever head 25, Upon a manual throwing of the control lever 11, 25 from the off position shown in Figs. 2 and 5 to the clutch engaged position shown in Fig. 7, the lever arm 11 is first rocked relative to the head 25 into engagement with the stop 27, and this relative rocking effects a release of the catch 31 from engagement with the tooth 32 due to the stop 34 positively forcing the catch away from the tooth 32 during such movement. The continued throwing of the control lever to the left causes a rocking of the shaft 12, which effects a throwing of the clutch 5 into engagement. During this engaging movement of the control lever the arm 17 remains at rest. The driving of the crank-shaft 2, however, after the throwing in of the clutch, causes the arm 17 to rock first upward a short distance, while the pin 24 is completing its up stroke, and then downward for its full down stroke and then up to the stopping position shown in Fig. 1. On the down stroke of the arm 17 the tooth 32 is swung upward into snap engagement with the catch 31, and during the up-stroke of said arm to its rest position, shown in Fig. 5, the control lever 11, 25 is thrown to its clutch releasing position by reason of the engagement of the tooth 32 with the catch 31, thereby effecting a release of the clutch before the wrist-pin 24 has reached the rest position shown in Fig. 1.

The lever 16 is connected in the usual, or in any suitable, manner to the toggle-links 36, which connect the opposed brake levers 37. Upon a clutch releasing movement of the lever 16 it acts on the toggles 36 to effect a brake-applying movement of the brake lever 37 to stop the rotation of the driven press parts.

In practice it is preferable to divide the rod 18 into a rod section 18ª and a yoke section 18ᵇ, the latter having one end connected to the arm 19 and its other end sliding on the rod section. A coiled expansion spring 38 is mounted on the rod section 18ª, within the yoke section, and has one end thrust against a stop shoulder on the inner end of the rod and its other end thrust against the inner end of the yoke so as to normally retain the inner end of the yoke and the stop shoulder 39 on the rod section in engagement, as shown in Fig. 4. A sleeve 40 encircles the spring 38 within the yoke and has one end in abutting engagement with the inner end of the yoke with its opposite end in slightly spaced relation to the spring stop 41 on the rod section when the rod and yoke are in normal relation, as shown in Fig. 4. When the wrist-pin 24 is approximately at the point *a* in its upward stroke, as illustrated in the upper portion of the diagram in Fig. 9, the upward pull on the rod 18 to effect a release of the clutch causes a compression of the spring 38 until the stop 41 engages the upper end of the sleeve 40. When such engagement takes place, a positive unyielding pull is applied to the rod section 18ª of the rod 18 and causes a quick positive breaking of the clutch toggles, and the expansive action of the spring 38, then acts to quickly throw the clutch to release position and to also quickly apply the brake levers 37 to stop the rotation of the driven parts. The release of the clutch, applying of the brake, and the complete stopping of the press parts takes place during the movement of the wrist pin 24 between the points *a* and *b* in its upward stroke, so that by the time the cranks 2ª of the crank-shaft 2 has reached the upward limit of its stroke, the clutch will be released and the brakes applied with the wrist-pin 24 of the clutch-releasing and brake-applying mechanism still some distance below the limit of its upward stroke. In the diagram in Fig. 9 the upper portion represents the movement of the wrist-pin 24, and the lower portion the movement of the crank 2ª, and shows by the line *c* that when the crank is at the upward limit of its stroke the wrist-pin is at the point *b* some distance short of the upward limit of its stroke. This prevents the crank-shaft from carrying over beyond its stop position and making another stroke of the press parts after the clutch has been released, inasmuch as the continued upward movement of the wrist-pin 24 to finish its up stroke causes a continued application of the brake with gradually increasing pressure. If the press crank *a* and wrist-pin 24 were coincident in position with respect to the shaft, the clutch-releasing and brake-applying mechanism would carry over beyond its top center position and start its down stroke with the press crank thereby effecting a release of the brake and permitting the weight of the plunger parts carried by the crank to complete the down stroke of the press parts to the possible injury of the operator.

The operation of the control mechanism embodying the invention, in connection with the general operation of the press, is as follows:—

The operator, having placed a workpiece in the press, throws the control lever 11, 25 to the left to effect a positive release of the brake levers 37 and engagement of the clutch 5 through the rocking of the shaft 12 and connected rocker arm 14 and lever 16. The initial movement of the lever arm 11 is relative to the lever head 25 until the arm 11 is moved into engagement with the stop screw 27, after which the arm and head move together to effect a throwing of the shaft 12. The initial relative movement of the lever arm 11 causes a throwing of the catch 31 out of engagement with the tooth 32, so as to permit the shaft 12 to be rocked relative to the rocker arm 17, that is connected to the wrist-pin 24 of the press. Upon the release of the lever arm 11 in its thrown position, the spring detent 33 forces it to its normal position with respect to the head 25, in which position the catch 31 is adapted to have engagement with the tooth 32, when the arm 17 is rocked for such purpose. The engaging of the clutch causes a cycle of movements of the press parts. As the crank-shaft traverses its down stroke, the wrist-pin 24 and arm 17, to which connected, are first moved upward to complete their upward strokes and then traverse their downward strokes, which latter movement will cause the tooth 32, on the inner end of arm 17, to raise and move into snap engagement with the catch 31. The automatic trip means, constituting the wrist-pin 24 and rocker-arm 17 and the parts connecting the same, is now in operative engagement with the clutch and brake operating means, so that as the wrist-pin 24 traverses the initial portion of its up stroke, compression of the clutch-operating means offers sufficient resistance to effect a compression of the spring 38. When the compression of the spring has been sufficient to bring the shoulder 41 of the rod section 18ª into engagement with the sleeve 40, of the yoke section 18ᵇ, the permissible operable relative movements of the sections of the rod 18 are stopped, and the trip mechanism then acts to effect a positive movement of the shaft 12 and connected parts to effect a breaking of the clutch toggles, whereupon the expansive action of the spring 38 causes a quick throwing out of the clutch and application of the brake levers 37. In this manner the clutch toggles are initially broken when the wrist-pin 24 has approximately reached the point *a* in its upward travel, and by the time the pin 24 has reached the point *b* in its upward travel, at which point the crank 2ª of the press is at the limit of its upward stroke, the press will have been stopped.

If it is desired to permit the press to continuously run, instead of being stopped at the completion of each revolution of the crank-shaft, the lever arm 11 is moved over against the stop 27 and the pin 28 is then pressed inward and turned to bring the enlargement 29 thereof into operative position to engage and hold the lever arm 11 against the stop 27, when the pin is permitted to return to its normal position. This holds the lever arm 11 and its catch 31 in such position as to permit the tooth 32 from engaging with the latter as its arm 17 rocks on the shaft 12.

We wish it understood that our invention is not limited to any particular construction or arrangement or form of the parts, as it is capable of numerous modifications and changes without departing from the spirit of the claims.

Having thus described our invention, what we claim as new and desire to secure by Letters Patent is:—

1. In combination, a drive member, a rotatable driven means having a crank-shaft, a clutch controlled driving connection between said member and means, manually operable control means for the clutch of said connection, a revoluble part driven by said driven means and having a trailing action relative to the crank-shaft of such means, a mechanism connecting said part and control means and automatically operable to throw the control means to release the clutch and stop the driven parts when the crank-shaft is at the limit of one of its strokes and before the revoluble part reaches the limit of its corresponding stroke.

2. In combination, a drive member, a rotatable driven means having a crank-shaft, a clutch controlled driving connection between said member and driven means, a brake for the driven means, manually operable control means to engage and release both the clutch and the brake, and means driven by said driven member and operable in synchronized relation to the crank-shaft to engage the control means at a predetermined point in the movement of the crank-shaft and to both release the clutch and apply the brake to effect a stopping of the driven member at a predetermined point in a cycle of the crank-shaft, and to continue the application of the brake if the chank-shaft continues beyond such stopping point.

3. In combination, a drive member, a crank-shaft, a clutch controlled connection between the drive member and crank-shaft, a brake operable to stop the rotation of the crank shaft, manually controlled means for operating the clutch and brake, means operable by the crank-shaft and adapted, at a predetermined point in its movement, to engage and operate said control means to release the clutch and apply the brake to effect a stopping of the crank-shaft at a predetermined point in its movement, and also operable to continue the application of the brake with increasing force, should the crank-shaft continue to turn beyond its predetermined stopping point.

4. In combination, a drive member, a crank-shaft, a clutch controlled driving connection between said driven member and means, a brake operable to stop the crank-shaft, manually operable control means for the clutch of said connection and for said brake, a rocker member, connection between said crank-shaft and rocker member for rocking the latter when the shaft is rotated, the strokes of the rocker member corresponding to and being retarded with respect to the strokes of the crank-shaft, and means automatically operable to engage said rocker-arm and control means at a predetermined point in the revolution of the crank-shaft to effect a throwing out of the clutch and an application of the brake to stop the crank-shaft when it has completed a revolution.

5. In combination, a drive member, a crank-shaft, a drive connection between said member and crank-shaft, a clutch for said connection, a brake for a part of said connection, to stop the rotation of the crank-shaft, control means manually operable to operate the clutch and the brake, a catch member in connection with said control means, and means reciprocally operable by the rotation of the crank-shaft and automatically operable to engage said catch and operate the control means to release the clutch and apply the brake to effect a stopping of the crank-shaft at the completion of a revolution thereof.

6. In combination, a drive member a crank-shaft, a drive connection between said member and crank-shaft, a clutch for said connection, a brake for a part of said connection to stop the rotation of the crank-shaft, control means manually operable to operate the clutch and the brake, a catch member in connection with said control means, and means reciprocally operable by the rotation of the crank-shaft and automatically operable to engage said catch and operate the control means to release the clutch and apply the brake to effect a stopping of the crank-shaft at the completion of a revolution thereof, said shaft operating means having a trailing action with respect to the turning of the crank-shaft, so that the brake-applying movement thereof is continued should the crank-shaft pass its predetermined stopping point.

7. In combination, a crank-shaft, clutch controlled drive means for said shaft, a trip means connected to and reciprocally operable by a rotation of the crank-shaft, manually operable control means for the clutch of said drive means, including a control lever having a catch part for engagement with said trip means when at a predetermined point in its movement with the crank-shaft whereby the continued movement of the crank-shaft imparts a clutch-releasing movement to said control means.

8. In combination, a crank-shaft, clutch controlled drive means for said shaft, a trip means connected to and reciprocally operable by a rotation of the crank-shaft, manually operable control means for the clutch of said drive means including a control lever having a catch part for engagement with said trip means when at a predetermined point in its movement with the crank shaft whereby the continued movement of the crank-shaft imparts a clutch-releasing movement to said control means, the control lever of said control means being operable to release its engagement with said trip means during an initial movement of the lever to engage the clutch.

9. In combination, a driven shaft, drive means for the shaft, a clutch for the drive means, a rock shaft, connection between the rock shaft and clutch for communicating operating movements from one to the other, a manually operable control lever keyed to the rock shaft and having a control part capable of limited rocking movements relative to the shaft, a catch on said control part, a rockable companion catch member, means connected to the driven shaft and operable by rotation thereof to impart rocking movements to said companion catch member to cause it to engage the catch on the control member of the lever when the driven shaft is at a predetermined point in its revolution, and to then act to throw the control lever to effect a release of the clutch.

10. In combination, a driven shaft, drive means for the shaft, a clutch for the drive means, a brake operable to stop the rotation of the shaft, a rock shaft, operating connection between the rock shaft and both said clutch and brake, a control lever on the shaft, catch means connected to the lever, trip means connected to and driven by a rotation of the driven shaft and having a companion catch member operable at a predetermined point in a rotation of the driven shaft to engage said catch means and coact therewith to move it and the rock shaft to effect a release of the clutch and an application of the brake.

11. In combination, a driven shaft, drive means for the shaft, a clutch for the drive means, a brake operable to stop the rotation of the shaft, a rock shaft, operating connection between the rock shaft and both said clutch and brake, a control lever on the shaft, catch means connected to the lever, trip means connected to and driven by a rotation of the driven shaft, and having a companion catch member operable at a predetermined point in a rotation of the driven shaft to engage said catch means and coact therewith to move it and the rock shaft to effect a release of the clutch and an application of the brake, the trip means having a retarded movement with respect to the rotation of the driven shaft whereby a continuation of the rotation of the driven shaft beyond its stopping point with the catch parts engaged will cause a continued application of the brake.

12. In combination, a driven shaft, drive means for the shaft, a clutch for the drive means, a brake operable to stop the rotation of the shaft, a rock shaft, operating connection between the rock shaft and both said clutch and brake, a control lever on the shaft, catch means connected to the lever, trip means connected to and driven by a rotation of the driven shaft and having a companion catch member operable at a predetermined point in a rotation of the driven shaft to engage said catch means and coact therewith to move it and the rock shaft to effect a release of the clutch and an application of the brake, the control lever, when initially moved to engage the clutch and release the brake, being automatically operable to release the engagement of the catch means with the companion catch member.

13. In combination, a driven shaft, drive means for the shaft, a clutch for the drive means, a brake operable to stop the rotation of the shaft, a rock shaft, operating connection between the rock shaft and both said clutch and brake, a control lever on the shaft, catch means connected to the lever, trip means connected to and driven by a rotation of the driven shaft and having a companion catch member operable at a predetermined point in the rotation of the driven shaft to engage said catch means and coact therewith to move it and the rock shaft to effect a release of the clutch and an application of the brake, and means for rendering said catch means inoperative.

14. In combination, a rotatable driven member, drive means for said member, a clutch for said means, a brake for said member, manually operable control means for said clutch and brake, trip means between said driven member and control means automatically operable at a predetermined point in a rotation of the driven member to actuate the control means to release the clutch and apply the brake, said trip means having a yielding portion, which stores up energy during the clutch-tripping movement of the trip means and then effects a quick release of the clutch and application of the brake.

15. In combination, a rotatable driven member, drive means for said member, a control clutch for the drive means, a brake operable to stop the member, manually operable control means for the clutch and brake, a trip means connected to and operable by a rotation of the driven member to engage and operate the control means to release the clutch and apply the brake when the driven member is at a predetermined point in the rotation thereof, said trip means having a pair of yieldingly connected parts which yield, when initially acting on the control means, to release the clutch and then come into stop engagement to impart a positive clutch-releasing movement to the control means, after which the trip means acts to quickly complete the release of the clutch and to apply the brake.

In testimony whereof, we have hereunto signed our names to this specification.

NEAL W. DORMAN.
MEREDITH R. HATCH.